F. G. LILJENROTH.
ELECTRICALLY PROPELLED MOTOR CAR.
APPLICATION FILED APR. 8, 1912.

1,052,263.

Patented Feb. 4, 1913.

Witnesses:
B. Dommers
E. Leckert

Inventor
Frans G. Liljenroth
By
Atty.

UNITED STATES PATENT OFFICE.

FRANS G. LILJENROTH, OF VESTERÅS, SWEDEN.

ELECTRICALLY-PROPELLED MOTOR-CAR.

1,052,263.  Specification of Letters Patent.  Patented Feb. 4, 1913.

Application filed April 8, 1912. Serial No. 689,398.

*To all whom it may concern:*

Be it known that I, FRANS G. LILJENROTH, a citizen of the Kingdom of Sweden, residing at Vesterås, Sweden, have invented new and useful Improvements in Electrically-Propelled Motor-Cars, of which the following is a specification.

It is well known to propel motor cars by means of an internal combustion motor in such manner that an electric power transmission consisting of a continuous current generator and a continuous current motor is arranged between the internal combustion motor and the wheels of the car. The advantage of such propulsion system lies essentially in that the internal combustion motor may run at constant speed and torque while the necessary variations of the speed and tractive power of the car may be accomplished by regulating the electric power transmission. For the purpose of obtaining small dimensions of the electric machines and small losses in the electric power transmission the variations of the torque of the electric motor should be controlled in such manner that the voltage and the intensity of the electric main current vary as little as possible.

The object of the present invention is to obtain such an effect by exciting the field of the electric motor in such manner, that great variations of the field strength of the motor are effected when the intensity of the main current varies slightly.

The invention consists, chiefly, in the combination with an electric power transmitting system for electrically propelled cars, of an exciter for the driving motor having three field windings one of which is shunted to the armature of the generator, and the second of which is connected in series to the armatures of the generator and the driving motor and so arranged that it counteracts the firstmentioned winding, while the third winding is connected to the armature of the exciter itself.

In the accompanying drawing I have shown in Figures 1–4 four different embodiments of my invention.

Figure 1:
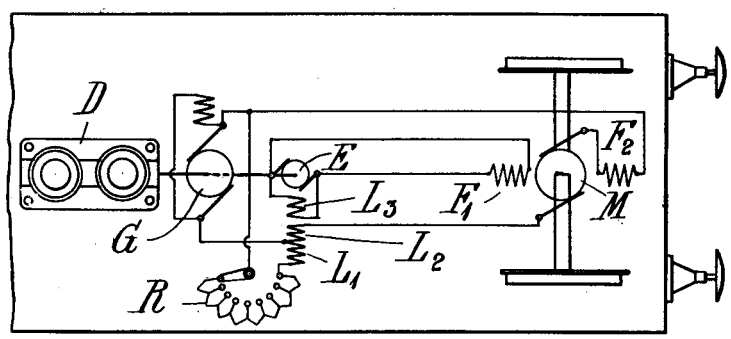

Referring to Fig. 1, D is an internal combustion engine, for instance a Diesel motor, to which is directly coupled a continuous current electric generator G. To the generator G is electrically connected a motor M the armature of which is in any well-known manner coupled to the driving wheels of the car. The motor M is provided with two magnetizing windings $F_1$ and $F_2$ respectively. The winding $F_2$ is connected in series to the armature of the motor M. The winding $F_1$ is connected to the armature of an exciter E, which may be driven by the internal combustion engine D directly or by means of any suitable transmission not shown in the drawings. The exciter E has three field windings $L_1$ $L_2$ and $L_3$ respectively. The winding $L_1$ is shunted to the armature of the generator G and its circuit may contain a suitable rheostat R. The winding $L_2$ is connected in series to the armatures of the generator G and the motor M in such manner that it counteracts the winding $L_1$. The winding $L_3$ is shunted to the armature of the exciter itself, but may be connected in series thereto, if desired. The winding $L_3$ has such a large resistance that the machine cannot excite itself by means of said winding alone. The windings $L_1$ and $L_2$ are so proportioned in relation to each other that they at normal voltage and intensity of the current delivered by the generator G compensate each other, the voltage of the exciter E being accordingly *nil* under such circumstances.

The operation of the system above described is as follows: If the resistance to the propulsion of the car begins to increase over the normal value, the car has a tendency to decrease its speed, the intensity of the main current being as a consequence increased. The winding $L_2$ accordingly preponderates over the winding $L_1$ and excites the machine E so that the latter delivers a magnetizing current to the winding $F_1$ of the motor M. The winding $F_1$ is connected to the armature of the exciter E in such manner that in this case the field of the motor M is strengthened. The torque of the motor is accordingly increased and its speed decreases while its watts remain substantially constant. If on the other hand the resistance to the propulsion of the car decreases under its normal value, the winding $L_1$ will preponderate over the winding $L_2$ and the excitation of the machine E will be reversed. The exciter E will accordingly in such case deliver a magnetizing current to the winding $F_1$ which weakens the magnetization of the motor M so that the torque of the latter will decrease and its speed increase, the watts of the motor always remaining substantially constant. Inasmuch as the exciter E on account of the provision of the three field windings $L_1$—$L_3$ is very sensitive for variations of the intensity of the main current, great variations of the field strength of the motor M are obtained at small variations of the intensity of the main current. Great variations of the speed and torque of the motor may accordingly be obtained automatically while the intensity as well as the voltage of the current remain practically constant. As the voltage and current intensity of the generator vary only slightly, the dimensions of said machine need not be taken larger than what corresponds to the watts actually transmitted.

By adjusting the rheostat R one may vary the value of the intensity and voltage of the main current at which the windings $L_1$ and $L_2$ compensate each other and in such manner control the amount of the power transmitted. The internal combustion engine must in such case, of course, be provided with a suitable regulator so that its effect may vary in a corresponding manner.

Figure 2:
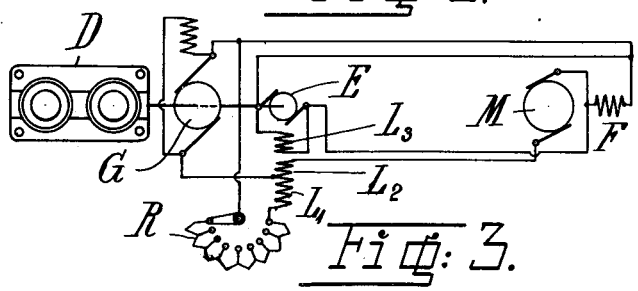

In the modification shown in Fig. 2 the driving motor has only one magnetizing winding F which is connected in series to the armatures of the generator G and the motor M, while the armature of the exciter E is connected in parallel to said winding F. In other respects the arrangement is the same as in Fig. 1.

Figure 3:
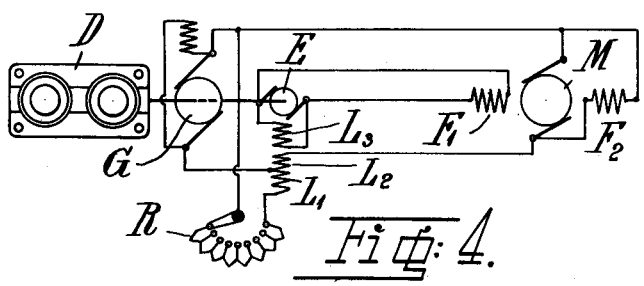

The modification shown in Fig. 3 differs from that shown in Fig. 1 only by that the field winding $F_2$ of the motor M is shunted to the armature of the motor.

Figure 4:
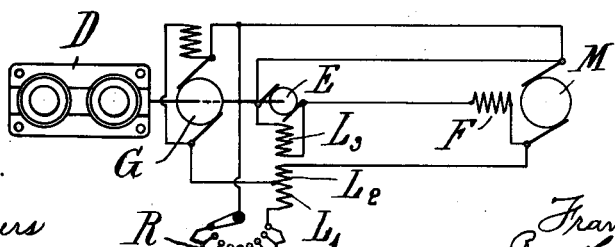

In the modification shown in Fig. 4 the motor M has only one field winding F which is in series to the armature of the exciter E connected to the armature of the motor M. In other respects the arrangement is the same as in Fig. 1.

The operation of the modifications shown in Figs. 2–4 is substantially the same as that of the system shown in Fig. 1.

Having now described my invention what I claim and desire to secure by Letters Patent of the United States is:

1. In combination with an electric power transmitting system for electric cars consisting of a generator for constant watts and a driving motor electrically connected to the generator, of an exciter for the driving motor having three field windings one of which is shunted to the armature of the generator, the second being connected in series to the armatures of the generator and the driving motor and so arranged that it counteracts the first mentioned winding, while the third winding is connected to the armature of the exciter itself, substantially as and for the purpose set forth.

2. In an electrically propelled car the combination of, an electric generator for constant watts, a driving motor having two field windings one of which is connected to the armature of the motor and an exciter connected to the second field winding of the driving motor and having three field windings, one of which is shunted to the armature of the generator, the second being connected in series to the armatures of the generator and the driving motor and so arranged that it counteracts the said shunt winding, while the third winding is connected to the armature of the exciter itself, substantially as and for the purpose set forth.

3. In an electrically propelled car the combination of, an electric generator for constant watts, a driving motor, an exciter for the latter having three field windings, one of which is shunted to the armature of the generator, the second being connected in series to the armatures of the generator and the driving motor and so arranged that it counteracts the said shunt winding, while the third winding is connected to the armature of the exciter itself, and a rheostat connected in series to said shunt-winding, substantially as and for the purpose set forth.

In testimony that I claim the foregoing as my invention, I have signed my name in presence of two subscribing witnesses.

FRANS G. LILJENROTH.

Witnesses:
A. HÖEGH,
C. AUT. ABRAHAMSEN.